(12) United States Patent
Taniguchi et al.

(10) Patent No.: US 9,190,212 B2
(45) Date of Patent: Nov. 17, 2015

(54) METHOD OF MANUFACTURING MULTILAYER CERAMIC ELECTRONIC COMPONENT

(75) Inventors: Takumi Taniguchi, Fukui (JP); Hiroyuki Matsumoto, Izumo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 791 days.

(21) Appl. No.: 13/484,300

(22) Filed: May 31, 2012

(65) Prior Publication Data

US 2012/0234463 A1     Sep. 20, 2012

Related U.S. Application Data

(62) Division of application No. 12/485,360, filed on Jun. 16, 2009, now Pat. No. 8,213,152.

(30) Foreign Application Priority Data

Jun. 20, 2008   (JP) ................................. 2008-161569

(51) Int. Cl.
  *H01G 4/12* (2006.01)
  *H01G 4/30* (2006.01)
  *H01G 4/012* (2006.01)
  *H01G 4/232* (2006.01)

(52) U.S. Cl.
  CPC ................ *H01G 4/30* (2013.01); *H01G 4/012* (2013.01); *H01G 4/232* (2013.01)

(58) Field of Classification Search
  CPC ......... H01G 4/012; H01G 4/232; H01G 4/30; H01G 4/2325; Y10T 29/435
  USPC ........ 29/25.41–25.42, 25.03; 361/303, 306.3, 361/311, 321.1
  See application file for complete search history.

(56) References Cited

U.S. PATENT DOCUMENTS 8,004,819 B2 *  8/2011  Nagamiya et al. ............. 361/303
8,056,199 B2 * 11/2011  Aoki et al. .................... 29/25.42

(Continued)

FOREIGN PATENT DOCUMENTS

| JP | 04-312909 A | 11/1992 |
| JP | 07-106189 A | 4/1995 |
| JP | 2006-237078 A | 9/2006 |

OTHER PUBLICATIONS

Taniguchi et al., "Multilayer Ceramic Electronic Component and Manufacturing Method Thereof", U.S. Appl. No. 12/485,360, filed Jun. 16, 2009.

(Continued)

*Primary Examiner* — Minh Trinh
(74) *Attorney, Agent, or Firm* — Keating & Bennett, LLP

(57) ABSTRACT

A method of manufacturing a multilayer ceramic electronic component includes a step of preparing a first ceramic green sheet on which at least one of a first internal electrode pattern and a second internal electrode pattern are printed, a second ceramic green sheet on which at least one of a first dummy conductor pattern and a second dummy conductor pattern are printed, and a third ceramic green sheet on which at least one of a third internal electrode pattern and a fourth internal electrode pattern are printed, wherein a width of the third dummy conductor pattern is made less than a width of the first dummy conductor pattern, and a width of the fourth dummy conductor pattern is made less than a width of the second dummy conductor pattern.

1 Claim, 15 Drawing Sheets

(56) References Cited

U.S. PATENT DOCUMENTS

| | | | |
|---|---|---|---|
| 8,194,391 B2* | 6/2012 | Takeuchi et al. | 361/321.4 |
| 8,213,152 B2* | 7/2012 | Taniguchi et al. | 361/306.3 |
| 8,717,738 B2* | 5/2014 | Nishioka et al. | 361/301.4 |
| 2010/0095498 A1* | 4/2010 | Aoki et al. | 29/25.42 |

OTHER PUBLICATIONS

Yoshida et al., "Monolithic Ceramic Electronic Component", U.S. Appl. No. 12/494,537, filed Jun. 30, 2009.

Iwanaga et al., "Laminated Ceramic Electronic Component and Manufacturing Method Therefor", U.S. Appl. No. 13/189,636, filed Jul. 25, 2011.

Sasaki, "Electronic Component", U.S. Appl. No. 13/187,678, filed Jul. 21, 2011.

Akazawa et al., "Multilayer Ceramic Electronic Component", U.S. Appl. No. 13/357,677, filed Jan. 25, 2012.

Official Communication issued in corresponding Japanese Patent Application No. 2008-161569, mailed on Jul. 31, 2012.

* cited by examiner

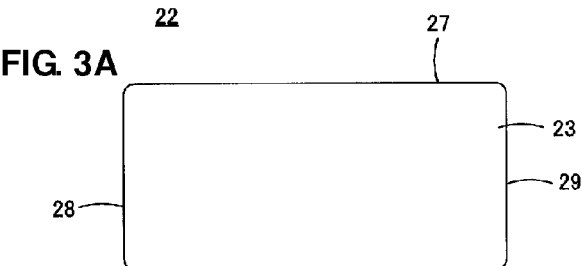
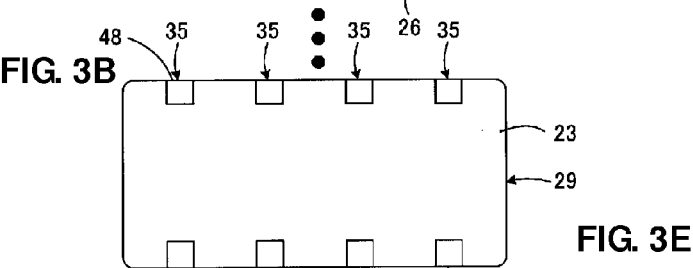
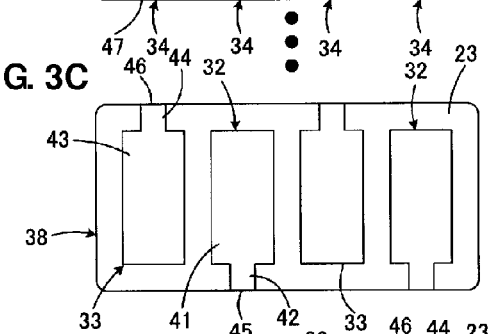
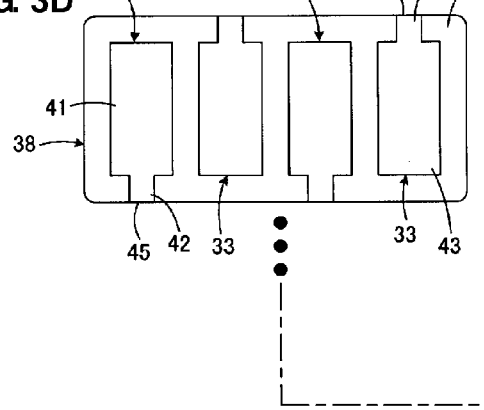
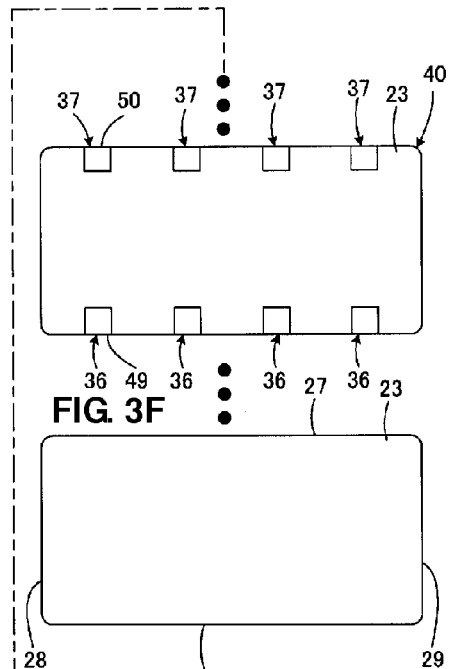

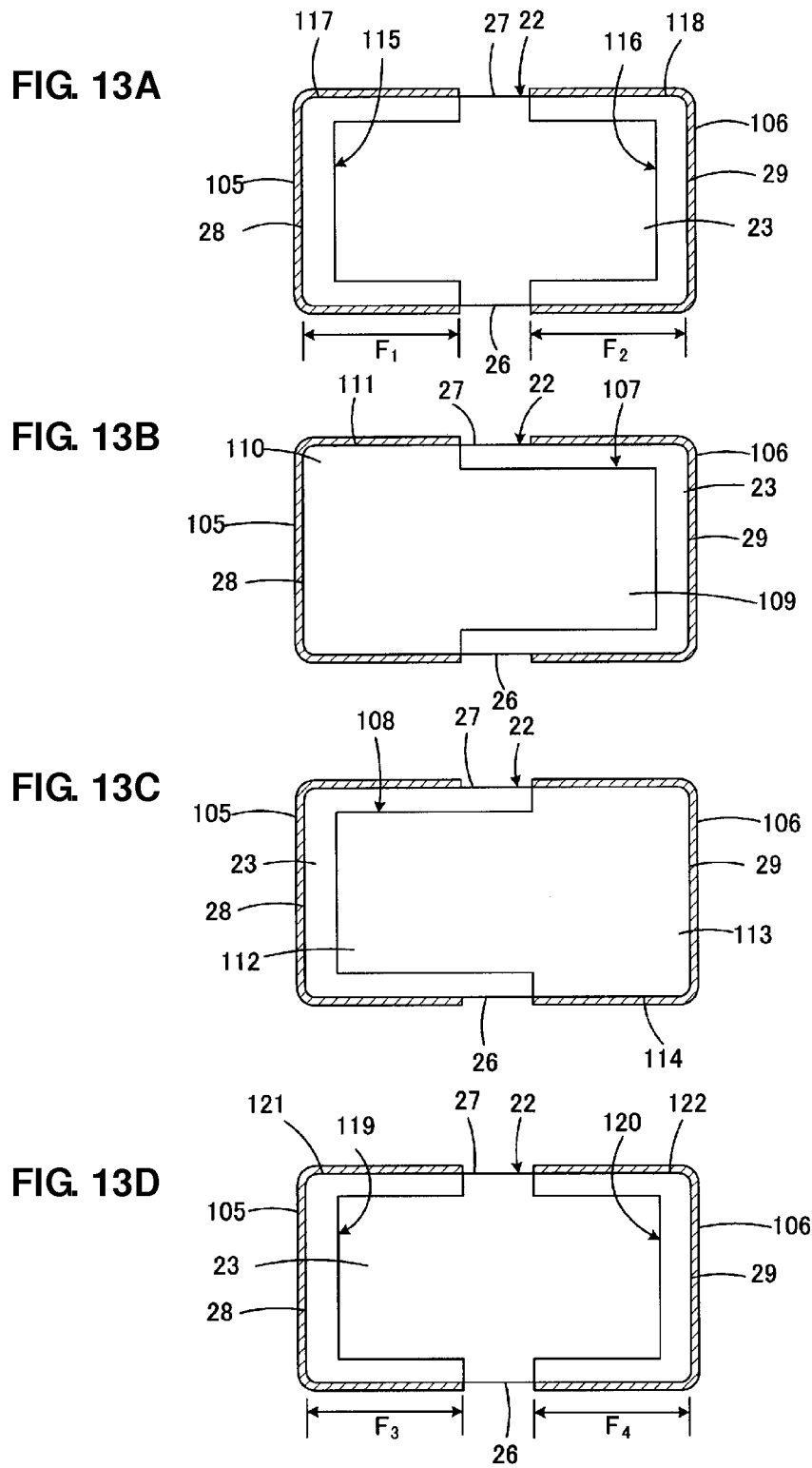

METHOD OF MANUFACTURING MULTILAYER CERAMIC ELECTRONIC COMPONENT

BACKGROUND OF THE INVENTION

1. Field of the Invention

The present invention relates to a method of manufacturing a multilayer ceramic electronic component. In particular, the present invention relates to a method of manufacturing a multilayer ceramic electronic component in which an external terminal electrode is coupled not only to an exposed end of an internal electrode but also to an exposed end of a dummy conductor so as to improve the fixing strength of the external terminal electrode.

2. Description of the Related Art

In recent years, electronic apparatuses, such as cell phones, notebook personal computers, digital still cameras, and digital audio systems have been downsized. These electronic apparatuses use many downsized, high-performance, multilayer ceramic electronic components.

Generally, a multilayer ceramic electronic component includes a ceramic element including a plurality of ceramic layers laminated on each other, internal electrodes provided inside the ceramic element, and external terminal electrodes provided on an outer surface of the ceramic element. The multilayer ceramic electronic component is disposed on a conductive land of a mount substrate and mounted on the substrate with a conductive bonding material, such as solder, interposed therebetween.

Currently, multilayer ceramic electronic components are required to be further downsized. If multilayer ceramic electronic components are further downsized, the opposed effective areas of the internal electrodes are reduced. This degrades the characteristics. In addition, for a multi-terminal multilayer ceramic electronic component, a plurality of strip external terminal electrodes must be arranged at relatively small pitches. If a typical method of printing a thick film paste is used, there is a limit to the accuracy of the paste application. Therefore, it is difficult to form external terminal electrodes with high accuracy.

In view of the foregoing, a method of forming external terminal electrodes by direct plating has been developed. This method enables the formation of thin, flat external terminal electrodes. The effective areas of the internal electrodes are increased accordingly. In addition, since plating is deposited at the exposed ends of the internal electrodes, external terminal electrodes can be accurately formed even at small pitches.

For example, Japanese Unexamined Patent Application Publication No. 2004-327983 discloses that when external terminal electrodes are formed by direct plating as described above, dummy conductors that do not substantially have electrical characteristics are used. Thus, plated metal will be deposited not only at the exposed ends of the internal electrodes but also at the exposed ends of the dummy conductors, and thus, the plating will grow more reliably.

If a multilayer ceramic electronic component including dummy conductors as described above is manufactured, internal electrode patterns and dummy conductor patterns are printed on ceramic green sheets and the ceramic green sheets are laminated and crimped on a sheet-by-sheet basis, and a mother block formed thereby is pressed.

As shown in FIG. 14, in the lamination and sheet-by-sheet crimping process, a ceramic green sheet 10 is transported to a press base 11 by a press head 9, and the ceramic green sheets 10 are successively laminated and crimped on the press base 11. Here, a plurality of ceramic green sheets 10 to be included in a mother block are laminated and crimped sequentially from the bottom. Therefore, the crimping load is repeatedly applied to the ceramic green sheets 10 that are laminated earlier and the conductor patterns such as internal electrode patterns and dummy conductor patterns. In particular, pressure is applied to a greater extent to high-density portions of the above-mentioned conductor patterns. This causes the conductor patterns on the lower main surface of the mother block, which is a surface near which the ceramic green sheets 10 that are laminated earlier are located, to become larger than the conductor patterns on the upper main surface thereof.

This phenomenon is problematic particularly when forming external terminal electrodes by direct plating. Specifically, if the conductor pattern on the lower main surface is extended, differences occur between the widths of the exposed ends of the internal electrodes or dummy conductors near the upper main surface of the ceramic element and the widths of those near the lower main surface thereof. These differences cause a problem in that the external terminal electrodes 12 have a trapezoidal shape, as shown in FIG. 15. FIG. 15 shows a side surface 14 of a ceramic element 13 on which the plurality of strip external terminal electrodes 12 are formed.

If the external terminal electrodes 12 have the trapezoidal shape as described above, a problem occurs in that a tombstone failure or a self-alignment failure occurs due to the directionality of the vertical direction or a problem occurs in that a solder bridge is likely to occur at the lower sides of adjacent trapezoidal external terminal electrodes 12.

SUMMARY OF THE INVENTION

To overcome the problems described above, preferred embodiments of the present invention provide a multilayer ceramic electronic component that does not include trapezoidal-shaped external terminal electrodes and a manufacturing method thereof.

According to a first preferred embodiment of the present invention, a multilayer ceramic electronic component includes a ceramic element including a plurality of laminated ceramic layers, the ceramic element having first and second main surfaces and a plurality of side surfaces, the first and second main surfaces being opposed to each other, and the side surfaces connecting between the first and second main surfaces, a first internal electrode disposed inside the ceramic element, the first internal electrode including a first effective portion and a first extension portion, the first extension portion extending from the first effective portion to at least one of the side surfaces, the first internal electrode having a first electrode exposed end, the first electrode exposed end being located at an end of the first extension portion and being exposed on the side surface, a second internal electrode disposed inside the ceramic element, the second internal electrode including a second effective portion and a second extension portion, the second effective portion being opposed to the first effective portion with a ceramic layer therebetween, the second extension portion extending from the second effective portion to at least one of the side surfaces, the second internal electrode having a second electrode exposed end, the second electrode exposed end being located at an end of the second extension portion and being exposed on the side surface, a first dummy conductor disposed in a first outer layer, the first outer layer being disposed near the first main surface inside the ceramic element such that none of the first internal electrode and the second internal electrode are provided in the first outer layer, the first dummy conductor having a first dummy exposed end, the first dummy exposed end being exposed on at least one of the side surfaces, a second dummy conductor disposed in the first outer layer, the second dummy conductor having a second dummy exposed end, the second dummy exposed end being exposed on at least one of the side surfaces, the second dummy conductor being electrically insulated from the first dummy conductor, a third dummy conductor disposed in a second outer layer, the second outer layer being disposed near the second main surface inside the ceramic element such that none of the first internal electrode and the second internal electrode is provided in the second outer layer, the third dummy conductor having a third dummy exposed end, the third dummy exposed end being exposed on at least one of the side surfaces, a fourth dummy conductor disposed in the second outer layer, the fourth dummy conductor having a fourth dummy exposed end, the fourth dummy exposed end being exposed on at least one of the side surfaces, the fourth dummy conductor being electrically insulated from the third dummy conductor, a first external terminal electrode disposed on at least one of the side surfaces of the ceramic element, and a second external terminal electrode disposed on at least one of the side surfaces of the ceramic element, the second external terminal electrode being electrically insulated from the first external terminal electrode.

The first electrode exposed end, the first dummy exposed end, and the third dummy exposed end define a first exposed end distribution area on at least one of the side surfaces, the first exposed end distribution area extending in at least one line along a lamination direction of the ceramic layer. The second electrode exposed end, the second dummy exposed end, and the fourth dummy exposed end define a second exposed end distribution area on at least one of the side surfaces, the second exposed end distribution area extending in at least one line along a lamination direction of the ceramic layer.

The first external terminal electrode preferably includes a first primary plated film, the first primary plated film being formed by direct plating such that the first primary plated film covers the first exposed end distribution area. The second external terminal electrode preferably includes a second primary plated film, the second primary plated film being formed by direct plating such that the second primary plated film covers the second exposed end distribution area.

A width of the first dummy exposed end is preferably substantially the same as a width of the third dummy exposed end. A width of the second dummy exposed end is preferably substantially the same as a width of the fourth dummy exposed end. A thickness of the third dummy exposed end is preferably less than a thickness of the first dummy exposed end. A thickness of the fourth dummy exposed end is preferably less than a thickness of the second dummy exposed end.

The dummy conductors do not substantially exhibit electrical characteristics. However, they may unexpectedly influence electrical characteristics.

In the first preferred embodiment of the present invention, if the plurality of side surfaces include first and second side surfaces, the first and second side surfaces being opposed to each other, the first exposed end distribution area is preferably disposed on the first side surface and the second exposed end distribution area is preferably disposed on the second side surface.

Also, if the plurality of side surfaces include first and second side surfaces and third and fourth side surfaces, the first and second side surfaces being opposed to each other, the third and fourth side surfaces being opposed to each other, the first exposed end distribution area is preferably disposed on the first side surface and the third and fourth side surfaces, and the second exposed end distribution area is preferably disposed on the second side surface and the third and fourth side surfaces.

In addition, the first exposed end distribution area may preferably be disposed in a plurality of lines on at least one of the side surfaces along a width direction of the side surface, and the second exposed end distribution area may preferably be disposed in a plurality of lines on at least one of the side surfaces along a width direction of the side surface.

A second preferred embodiment of the present invention provides a method for manufacturing the above-mentioned multilayer ceramic electronic component including the above-described ceramic element, first internal electrode, second internal electrode, first dummy conductor, second dummy conductor, third dummy conductor, fourth dummy conductor, first external terminal electrode, and second external terminal electrode.

The multilayer ceramic electronic component manufacturing method according to the second preferred embodiment of the present invention includes the steps of (a) preparing a first ceramic green sheet on which a first internal electrode pattern and/or a second internal electrode pattern are printed, a second ceramic green sheet on which a first dummy conductor pattern and/or a second dummy conductor pattern are printed, and a third ceramic green sheet on which a third internal electrode pattern and/or a fourth internal electrode pattern are printed, (b) obtaining a non-baked ceramic multilayer body by laminating a predetermined number of third ceramic green sheets, a predetermined number of first ceramic green sheets, and a predetermined number of second ceramic green sheets sequentially from the bottom while applying pressure on a sheet-by-sheet basis, (c) baking the non-baked ceramic multilayer body, and (d) forming a first external terminal electrode and a second external terminal electrode by performing direct plating on the baked ceramic multiplayer body.

In step (a), a width of the third dummy conductor pattern is preferably less than a width of the first dummy conductor pattern, and a width of the fourth dummy conductor pattern is preferably less than a width of the second dummy conductor pattern.

According to the preferred embodiments of the present invention, when manufacturing a multilayer ceramic electronic component, the width of the third dummy conductor pattern is less than that of the first dummy conductor pattern and the width of the fourth dummy conductor pattern is less than that of the second dummy conductor pattern. Thus, even if pressure is repeatedly applied to the second outer layer including the third and fourth dummy conductor patterns in the lamination and sheet-by-sheet crimping process, and thus, the sizes of the third and fourth dummy conductor patterns are increased, the width of the third dummy exposed end of the third dummy conductor pattern are substantially the same as that of the first dummy exposed end of the first dummy conductor and the width of the fourth dummy exposed end of the fourth dummy conductor pattern are substantially the same as that of the second dummy exposed end of the second dummy conductor in the obtained multilayer ceramic electronic component.

Therefore, when forming a primary plated film of the external terminal electrode by direct plating such that the primary plated film covers the exposed end distribution area, an edge of the primary plated film is straight or substantially straight. Therefore, an edge of the external terminal electrode is also straight or substantially straight. This prevents the occurrence of a failure during mounting. That is, the problems described with reference to FIGS. 14 and 15 are prevented.

Other features, elements, steps, characteristics and advantages of the present invention will become more apparent from the following detailed description of preferred embodiments of the present invention (with reference to the attached drawings).

BRIEF DESCRIPTION OF THE DRAWINGS

FIGS. 3A to 3F are plan views showing an internal structure of a ceramic element included in the multilayer ceramic electronic component shown in FIG. 1.

FIGS. 13A to 13D show a fifth preferred embodiment of the present invention and correspond to FIGS. 3A to 3F.

DETAILED DESCRIPTION OF PREFERRED EMBODIMENTS

Figure 1:
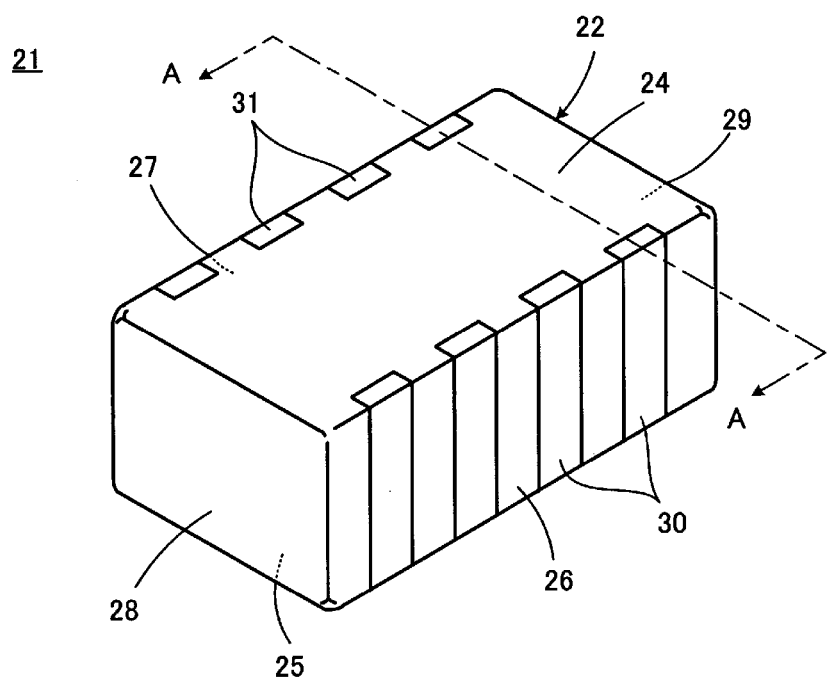
FIG. 1 is a perspective view of a multilayer ceramic electronic component according to a first preferred embodiment of the present invention.
Figure 2:
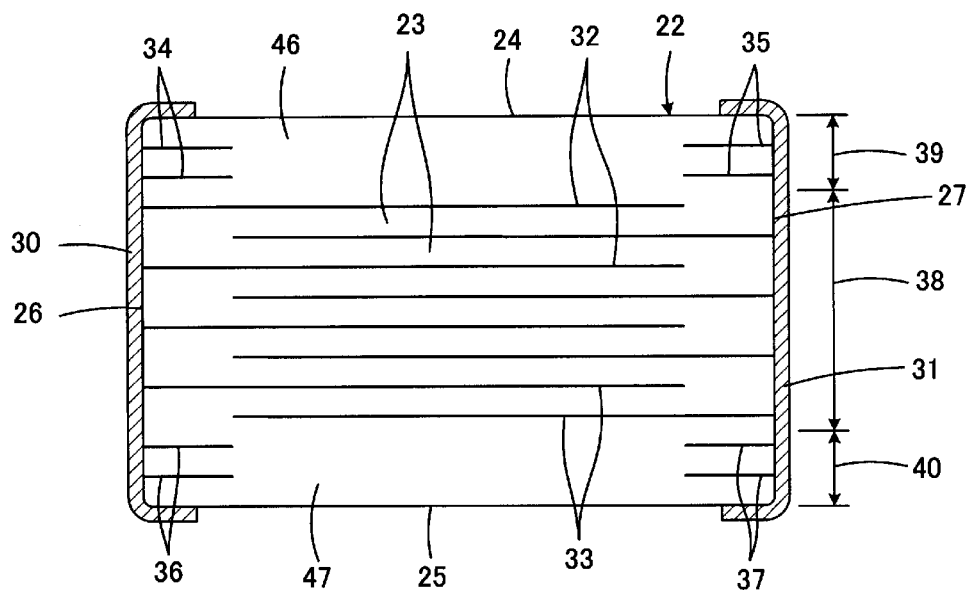
FIG. 2 is a sectional view taken along line A-A of FIG. 1.

FIGS. 1 to 6 are drawings showing a multilayer ceramic electronic component 21 according to a first preferred embodiment of the present invention. FIG. 1 is a perspective view showing the multilayer ceramic electronic component 21. FIG. 2 is a sectional view taken along line A-A of FIG. 1.

FIGS. 3A to 3F are plan views showing an internal structure of a ceramic element 22 included in the multilayer ceramic electronic component 21 shown in FIG. 1.

As shown in FIGS. 1 to 3, the ceramic element 22 included in the multilayer ceramic electronic component 21 is formed by laminating a plurality of ceramic layers 23. The ceramic element 22 has a first main surface 24 and a second main surface 25, which are opposed to each other, and a first side surface 26, a second side surface 27, a third side surface 28, and a fourth side surface 29 connecting the main surfaces 24 and 25. The first side surface 26 and second side surface 27 are opposed to each other, and the third side surface 28 and fourth side surface 29 are opposed to each other. The order of FIGS. 3A to 3F indicates the lamination order of the plurality of ceramic layers 23.

As shown in FIG. 1, the multilayer ceramic electronic component 21 has is substantially array-shaped and includes a plurality of first external terminal electrodes 30 provided on the first side surface 26 and a plurality of second external terminal electrodes 31 formed on the second side surface 27. The first external terminal electrodes 30 and second external terminal electrodes 31 are insulated from each other. Each of the first external terminal electrodes 30 includes a first primary plated film (not shown), and each of the second external terminal electrodes 31 includes a second primary plated film (not shown).

As shown in FIGS. 2 and 3A to 3F, first internal electrodes 32 second internal electrodes 33, first dummy conductors 34, second dummy conductors 35, third dummy conductors 36, and fourth dummy conductors 37 are disposed inside the ceramic element 22. The first internal electrodes 32, the first dummy conductors 34, and the third dummy conductors 36 extend to the first side surface 26 so that the electrodes and dummy conductors are electrically coupled to the first external terminal electrodes 30. The second internal electrodes 33, the second dummy conductors 35, and the fourth dummy conductors 37 extend to the second side surface 27 so that the electrodes and dummy conductors are electrically coupled to the second external terminal electrodes 31.

The ceramic element 22 includes an inner layer 38 including the first internal electrodes 32 and the second internal electrodes 33, and a first outer layer 39 and a second outer layer 40 which include no first internal electrodes 32 or second internal electrodes 33. The first outer layer 39 is disposed near the first main surface 24, and the second outer layer 40 is disposed near the second main surface 25. The first dummy conductors 34 and second dummy conductors 35 are disposed in the first outer layer 39, and the third dummy conductors 36 and fourth dummy conductors 37 are disposed in the second outer layer 40.

As shown in FIGS. 3C and 3D, each first internal electrode 32 includes a first effective portion 41 and a first extension portion 42 extending from the first effective portion 41 to the first side surface 26. Each second internal electrode 33 includes a second effective portion 43 and a second extension portion 44 extending from the second effective portion 43 to the second side surface 27. Each first extension portion 42 has a width less than that of the corresponding first effective portion 41. Each second extension portion 44 has a width less than that of the corresponding second effective portion 43.

Portions of a first effective portion 41 and a second effective portion 43 that are opposed to each other with a ceramic layer 23 disposed therebetween have a predetermined electrical characteristic.

A first electrode exposed end 45 that is exposed on the first side surface is located at an end of each first extension portion 42. A second exposed end 46 that is exposed on the second side surface 27 is located at an end of each second extension portion 44. Each first electrode exposed end 45 defines a connection to a corresponding first external terminal electrode 30, and each second electrode exposed end 46 defines a connection to a connection to a corresponding second external terminal electrode 31.

If a plurality of first internal electrodes 32 and a plurality of second internal electrodes 33 are arranged on the same plane as shown in this preferred embodiment, the first internal electrodes 32 and second internal electrodes 33 are preferably alternately disposed on the same plane. This prevents one of the first extension portions 42 and second extension portions 44 from being unevenly disposed in the vicinity of the first side surface 26 and/or second side surface 27. Thus, the connections of the adjacent ceramic layers 23 to each other are disposed in a balanced manner. As a result, the reliability of the multilayer ceramic electronic component 21 is improved.

The first dummy conductors 34 and second dummy conductors 35 are electrically insulated from each other. The third dummy conductors 36 and fourth dummy conductors 37 are electrically insulated from each other. In this preferred embodiment, the first dummy conductors 34 and the second dummy conductors 35 are preferably arranged on the same plane and the third dummy conductors 36 and fourth dummy conductors 37 are preferably arranged on the same identical plane. However, the dummy conductors and 34 and 35 do not necessarily need to be arranged on the same plane, nor do the dummy conductors 36 and 37.

Each first extension portion 42, a corresponding first dummy conductor 34, and a corresponding third dummy conductor 36 are arranged such that the extension portion and the dummy conductors overlap one another when the ceramic element 22 is viewed along the lamination direction of the ceramic layers 23. Each second extension portion 44, a corresponding second dummy conductor 35, and a corresponding fourth dummy conductor 37 are arranged such that the extension portion and dummy conductors overlap one another when the ceramic element 22 is viewed along the lamination direction of the ceramic layers 23.

Each first dummy conductor 34 includes a first dummy exposed end 47 located at an end thereof and exposed on the first side surface 26. Each first dummy exposed end 47 defines a connection to a first external terminal electrode 30. Each second dummy conductor 35 includes a second dummy exposed end 48 located at an end thereof and exposed on the second side surface 27. Each second dummy exposed end 48 defines a connection to a second external terminal electrode 31. Each third dummy conductor 36 includes a third dummy exposed end 49 located at an end thereof and exposed on the first side surface 26. Each third dummy exposed end 49 defines a connection to a first external terminal electrode 30. Each fourth dummy conductor 37 includes a fourth dummy exposed end 50 located at an end thereof and exposed on the second side surface 27. Each fourth dummy exposed end 50 defines a connection to a second external terminal electrode 31.

Figure 4:
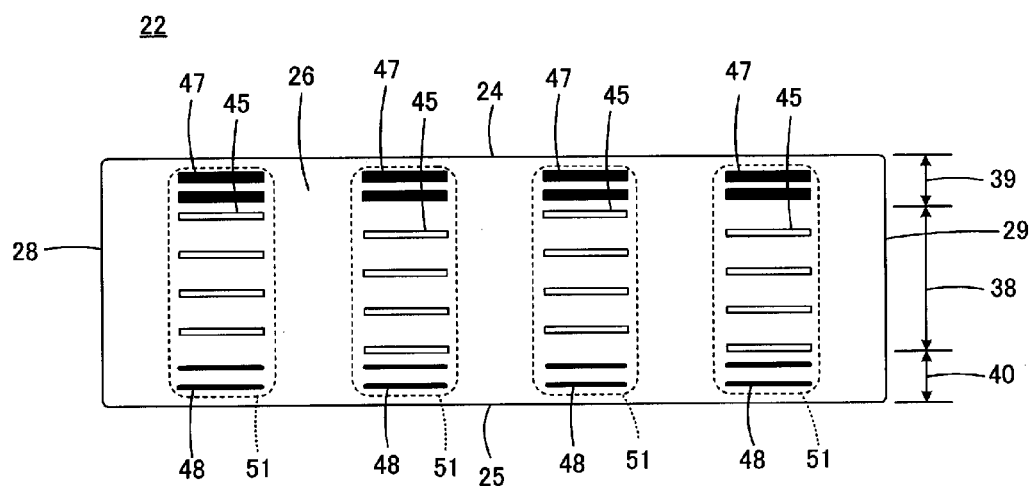
FIG. 4 shows a first side surface of the ceramic element of the multilayer ceramic electronic component shown in FIG. 1 in a stage before external terminal electrodes are formed.

FIG. 4 shows the first side surface 26 of the ceramic element 22 in a stage before the external terminal electrodes 30 and 31 are formed. In FIG. 4, to distinguish the first electrode exposed ends 45, the first dummy exposed ends 47, and the third dummy exposed ends 49 from each other, the first electrode exposed ends 45 are shown using outlined rectangles, the first dummy exposed ends 47 are shown using solid rectangles having a relatively large height, and the third dummy exposed ends 49 are shown using thick lines.

As described above, since the first extension portions 42, the corresponding first dummy conductors 34, and the corresponding third dummy conductors 36 are preferably arranged such that the extension portions and the corresponding dummy conductors overlap one another when the ceramic element 22 is viewed along the lamination direction of the ceramic layers 23, the first electrode exposed ends 45, the first dummy exposed ends 47, and the third dummy exposed ends 49 define a plurality of first exposed end distribution areas 51 extending along the lamination direction of the ceramic layers 23 in lines. Each first exposed end distribution area 51 is preferably covered with a first primary plated film included in a corresponding first external terminal electrode 30.

While each first dummy exposed end 47 and each third dummy exposed end 49 have substantially the same width, the third dummy exposed end 49 has a thickness less than that of the first dummy exposed end 47. Each first electrode exposed end 45 preferably also has a width substantially the same as those of a corresponding first dummy exposed end 47 and a corresponding third dummy exposed end 49. In this specification, a difference of about 10 μm or less between two widths is considered as "substantially the same."

Each first electrode exposed end 45 may preferably have a thickness greater than that of a corresponding first dummy exposed end 47 and may preferably have a thickness less than that of a corresponding third dummy exposed end 49. However, since preferred embodiments of the present invention prevent a mount failure caused by the expansion of the ends of the external terminal electrodes 30 and 31 to a greater extent than necessary, the relationship between the thickness of each of the first electrode exposed end 45 and that of the corresponding first dummy exposed end 47 and the relationship between the thickness of each the first electrode exposed end 45 and that of the corresponding third dummy exposed end 49 need not necessarily be defined.

Although not shown, each second electrode exposure end 46, a corresponding second dummy exposure end 48, and a corresponding fourth dummy exposure end 50 define a second exposed end distribution area on the second side surface 27. Each second exposed end distribution area is covered with a second primary plated film included in a corresponding second external terminal electrode 31. Similarly, each second dummy exposure end 48 and a corresponding fourth dummy exposure end 50 have substantially the same width, and each fourth dummy exposure end 50 has a thickness less than that of a corresponding second dummy exposure end 48. Likewise, each second electrode exposure end 46 preferably also has a width substantially the same as those of a corresponding second dummy exposure end 48 and a corresponding fourth dummy exposure end 50.

The number of ceramic layers 23 laminated in each of the first outer layer 39 and second outer layer 40 is preferably 1 to 50, for example. The respective numbers of first dummy conductors 34, second dummy conductors 35, third dummy conductors 36, and fourth dummy conductors 37 disposed in the first outer layer 39 and second outer layer 40 are preferably 1 to 30, for example.

The material of the ceramic layers 23 may preferably be a dielectric ceramic including, for example, $BaTiO_3$, $CaTiO_3$, $SrTiO_3$, or $CaZrO_3$, for example, as the main ingredient. In addition, a material obtained by adding a sub-ingredient such as an Mn compound, an Fe compound, a Cr compound, a Co compound, or a Ni compound, for example, to such a main ingredient may preferably be used. Furthermore, a piezoelectric ceramic such as a PZT ceramic, a semiconductor ceramic such as a spinel ceramic, for example, may preferably be used.

If a dielectric ceramic is used as the material of the ceramic layers 23, the multilayer ceramic electronic component 21 functions as a capacitor; if a piezoelectric ceramic is used, it functions as a piezoelectric component; if a semiconductor ceramic is used, it functions as a thermistor. The ceramic layers 23 preferably have a thickness of about 0.1 μm to about 10 μm, for example, after undergoing baking.

The conductive material of the internal electrodes 32 and 33 and the dummy conductors 34 to 37 may preferably be, for example, Ni, Cu, Ag, Pd, or Au, or an alloy including any one of these materials. The conductive material of the internal electrodes 32 and 33 and that of the dummy conductors 34 to 37 are preferably made of an identical metal. Each of the internal electrodes 32 and 33 and the dummy conductors 34 to 37 preferably have a thickness of about 0.1 μm to about 2.0 μm, for example, after undergoing baking. In particular, each of the third dummy conductor 36 and the fourth dummy conductor 37 preferably have a thickness of about 1.0 μm or less, for example, after undergoing baking.

In addition to a primary plated film arranged to cover a corresponding exposed end distribution area 51, the external terminal electrodes 30 and 31 may preferably include an upper plated film disposed on the primary plated film. Each primary plated film and each upper plated film are preferably made of, for example, one metal selected from a group of Cu, Ni, Sn, Pb, Au, Ag, Pd, Bi, and Zn, or an alloy including the metal.

For example, if Ni is used as the material of the internal electrodes 32 and 33 and the dummy conductors 34 to 37, Cu is preferably used as the material of the primary plated films, since Cu has good bondability with Ni. In addition, if each upper plated film includes a plurality of layers, Ni is preferably used as the metal of which the first layer near the primary plated film is made, since Ni has a solder barrier property, and Sn or Au is preferably used as the metal of which the second layer near the outer surface is made, since both Sn and Au have good solder wettability.

The thickness of each of the primary plated film and the per-layer thickness of the upper plated films are preferably about 1 μm to about 15 μm, for example.

Next, an example of a method for manufacturing the above-mentioned multilayer ceramic electronic component 21 will be described.

Ceramic green sheets defining the ceramic layers 23, a conductive paste defining the internal electrodes 32 and 33, and a conductive paste defining the dummy conductors 34 to 37 are prepared. The ceramic green sheets and the conductive paste include a binder and a solvent. The binder and solvent may preferably be a known organic binder and a known organic solvent, respectively.

Next, the conductive paste is printed on each ceramic green sheet in a predetermined pattern, for example, by screen printing. Thus, first and second internal electrode patterns defining first internal electrodes 32 and second internal electrodes 33, respectively, and first to fourth dummy conductor patterns defining first to fourth dummy conductors 34 to 37, respectively, are printed. In the following description, sheets on which the first and second internal electrode patterns are printed will be referred to as first ceramic green sheets, sheets on which the first and second dummy conductor patterns are printed will be referred to as second ceramic green sheets, sheets on which the third and fourth dummy conductor patterns are printed will be referred to as third ceramic green sheets, and sheets on which no internal electrode patterns nor dummy conductor patterns are printed will be referred to as fourth ceramic green sheets.

Both first and second internal electrode patterns may be formed on a first ceramic green sheet or one of first and second internal electrode patterns may be formed thereon. In addition, both first and second dummy conductor patterns may be formed on a second ceramic green sheet or one of first and second dummy conductor patterns may be formed thereon. Furthermore, both third and fourth dummy conductor patterns may be formed on a third ceramic green sheet or one of third and fourth dummy conductor patterns may be formed thereon.

Figure 5:
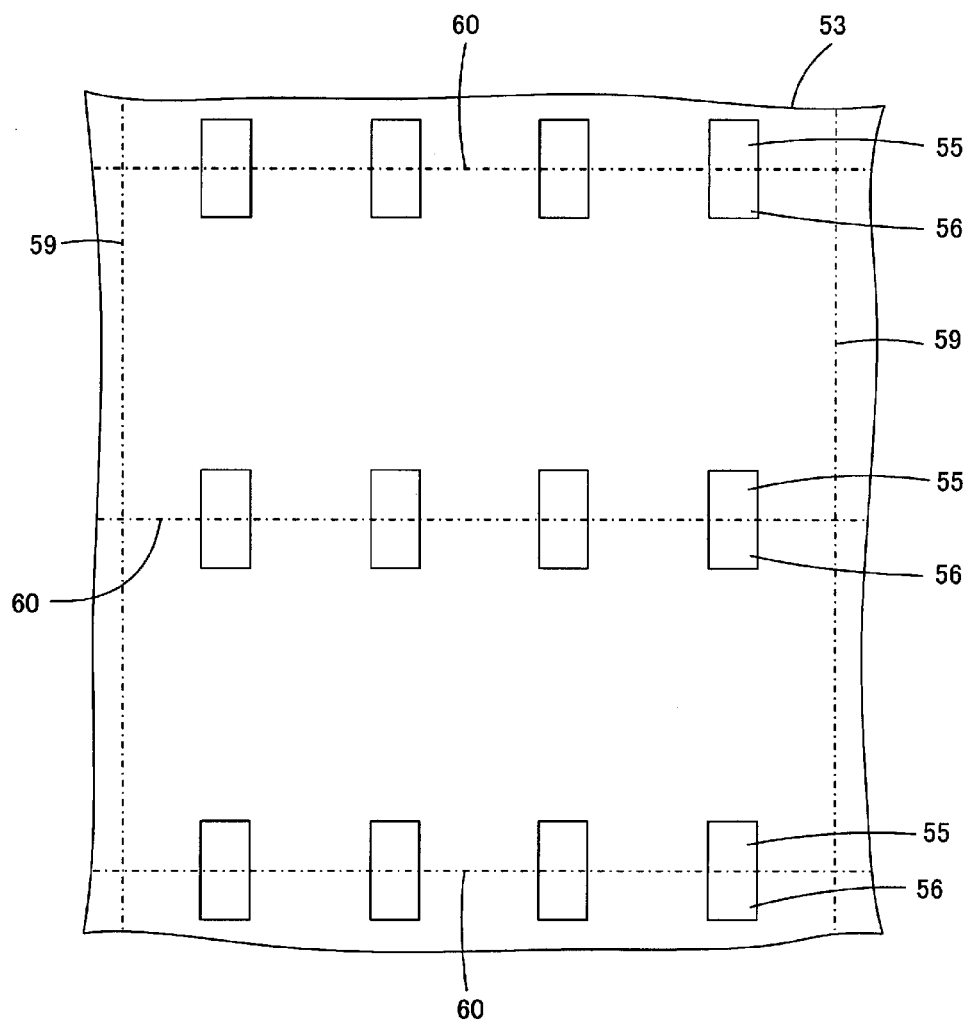
FIG. 5 is a plan view showing first dummy conductor patterns and second dummy conductor patterns printed on a second ceramic green sheet located in a first outer layer to show a method for manufacturing the multilayer ceramic electronic component shown in FIG. 1.
Figure 6:
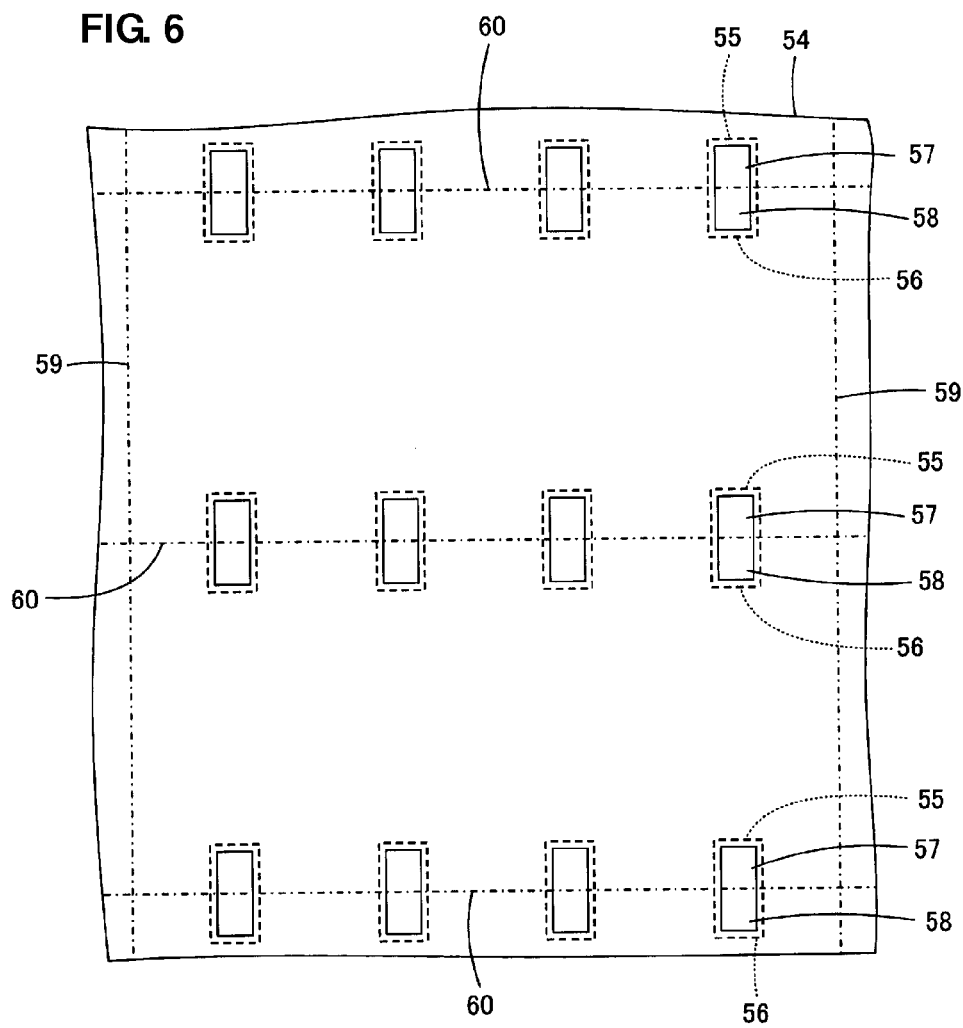
FIG. 6 is a plan view showing third dummy conductor patterns and fourth dummy conductor patterns printed on a third ceramic green sheet located in a second outer layer to show the method for manufacturing the multilayer ceramic electronic component shown in FIG. 1.

FIG. 5 is a plan view showing first dummy conductor patterns 55 and second dummy conductor patterns 56 printed on a second ceramic green sheet 53. FIG. 6 is a plan view showing third dummy conductor patterns 57 and fourth dummy conductor patterns 58 on a third ceramic green sheet 54.

In FIGS. 5 and 6, the second ceramic green sheet 53 and third ceramic green sheet 54 are each configured in a mother material state. Chain lines represent cut lines 59 and cut lines 60. Cutting is performed along the cut lines 59 and 60 in the cutting process to be described later.

In FIG. 6, frames shown using dotted lines provide guidelines for the sizes of the first dummy conductor patterns 55 and second dummy conductor patterns 56 shown in FIG. 5. As shown in FIG. 6, the area of each third dummy conductor pattern 57 is preferably less than that of a corresponding first dummy conductor pattern 55, and the area of each fourth dummy conductor pattern 58 is preferably less than that of a second dummy conductor pattern 56. However, this is not necessarily required. It is sufficient that each third dummy conductor pattern 57 has a smaller width than a corresponding first dummy conductor pattern 55 and that each fourth dummy conductor pattern 58 has a smaller width than a corresponding second dummy conductor pattern 56.

If the widths of portions defining the exposed ends of the first to fourth dummy conductor patterns 55 to 58 are represented by $W_1$, $W_2$, $W_3$, and $W_4$, respectively, the values of $W_1$, $W_2$, $W_3$, and $W_4$ are preferably all about 1.03 to about 1.16, for example. If the above-mentioned values exceed this range, the widths of the first dummy exposed end 47 and second dummy exposure end 48 may be excessively increased, and thus, the external terminal electrodes 30 and 31 may have a substantially inverted trapezoidal shape. If the areas of the first to fourth dummy conductor patterns 55 to 58 are represented by $S_1$, $S_2$, $S_3$, and $S_4$, respectively, the values of $S_1/S_3$ and $S_2/S_4$ are preferably about 1.05 to about 1.35, for example.

In this preferred embodiment, as shown in FIG. 5, each first dummy conductor pattern 55 and a corresponding second dummy conductor pattern 56 are integrally printed as a series of patterns. Then, in the cutting step, cutting is performed along the cut lines 60. Thus, the series of patterns are divided into the first dummy conductor patterns 55 and second dummy conductor patterns 56. Therefore, $W_1$ is always equal to or substantially equal to $W_2$.

Likewise, as shown in FIG. 6, each third dummy conductor pattern 57 and a corresponding fourth dummy conductor pattern 58 are integrally printed as a series of patterns. Then, in the cutting step, cutting is performed along the cut lines 60. Thus, the series of patterns are divided into the third dummy conductor patterns 57 and fourth dummy conductor patterns 58. Therefore, $W_3$ is always equal to or substantially equal to $W_4$.

Next, the ceramic green sheets are laminated and crimped on a sheet-by-sheet basis. The ceramic green sheets are laminated in order of a predetermined number of fourth ceramic green sheets, predetermined number of third ceramic green sheets, predetermined number of first ceramic green sheets, predetermined number of second ceramic green sheets, and predetermined number of fourth ceramic green sheets. As a result, a raw mother multilayer body is obtained. Here, the crimp conditions are controlled such that, in the mother multilayer body subjected to the sheet-by-sheet crimping, each first dummy conductor pattern and a corresponding second dummy conductor pattern 56 have substantially the same area and each third dummy conductor pattern 57 and a corresponding fourth dummy conductor pattern 58 have substantially the same area. The mother multilayer body is crimped in the lamination direction by a hydrostatic press or other suitable method. The pressure applied when performing sheet-by-sheet crimping is preferably about 10 kN to about 500 kN, for example.

Next, the raw mother multilayer body is cut into a predetermined size. Thus, a raw ceramic element 22 is cut off.

Next, the raw ceramic element 22 is baked. The baking temperature is preferably in the range of about 900° C. to about 1300° C., for example, although the baking temperature depends on a ceramic material included in the ceramic green sheets or a metal material included in a used conductive paste.

Next, the ceramic element 22 is subjected to grinding, such as barrel finishing, for example, as required. The electrode exposed ends 45 and 46 of the internal electrodes 32 and 33 and the dummy exposed ends 47 to 50 of the dummy conductors 34 to 37 are preferably plane-ground. Simultaneously, the ends or corners of the ceramic element 22 are preferably rounded.

Next, plating is performed. Thus, primary plated films to be included in external terminal electrodes 30 and 31 are formed such that the primary plated films cover the exposed end distribution areas 51. Electrolytic plating or electroless plating may be used. However, electroless plating has a disadvantage in that a pretreatment must be performed using a catalyst so as to increase the plating deposition speed, and thus, the process is relatively complicated. Therefore, electrolytic plating is preferably adopted. In addition, plating is preferably performed using barrel plating.

Next, at least one upper plated film is formed on the primary plated film as required.

Figure 7:
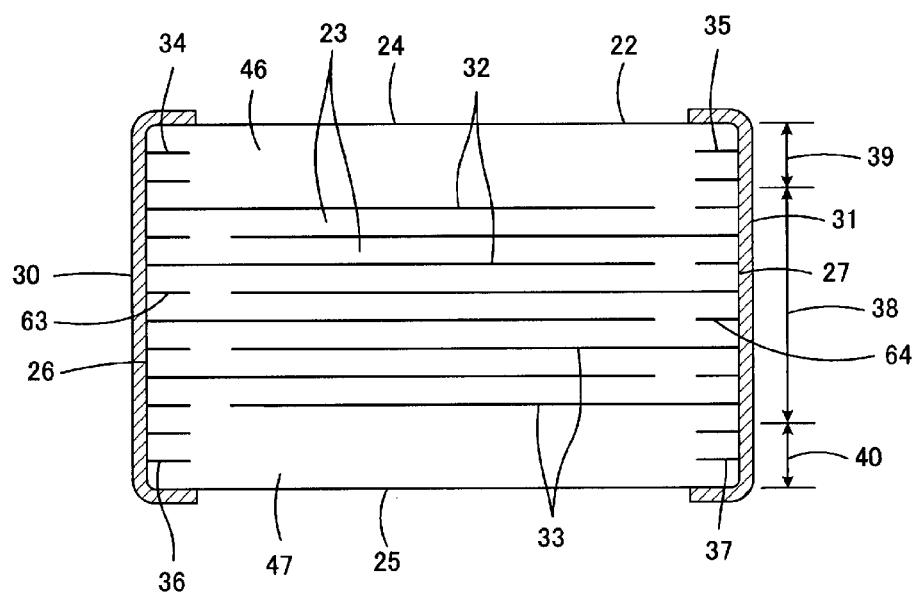
FIG. 7 shows a second preferred embodiment of the present invention and corresponds to FIG. 2.

FIG. 7 shows a second preferred embodiment of the present invention and corresponds to FIG. 2. In FIG. 7, elements corresponding to the elements shown in FIG. 2 are denoted by the same reference numerals and will not be described herein.

A multilayer ceramic electronic component 21a according to the second preferred embodiment includes fifth dummy conductors 63 and sixth dummy conductors 64 that provided in the inner layer 38. Each fifth dummy conductor 63 is configured such that it is flush or substantially flush with a second internal electrode 33, and extends to the first side surface 26 so that it is electrically coupled to a first external terminal electrode 30. Each sixth dummy conductor 64 is configured such that it is flush or substantially flush with a first internal electrode 32, and extends to the second side surface 27 so that it is electrically coupled to a second external terminal electrode 31.

FIG. 8 shows a third preferred embodiment of the present invention and corresponds to FIG. 3. FIG. 8 also shows external terminal electrodes. In FIG. 8, elements corresponding to the elements shown in FIG. 3 are denoted by the same reference numerals and will not be described herein.

A multilayer ceramic electronic component 21b according to the third preferred embodiment is used as a multi-terminal, low-ESL multilayer ceramic capacitor. The multilayer ceramic electronic component 21b has a similar appearance to that of the multilayer ceramic electronic component 21 shown in FIG. 1.

Figure 8A:
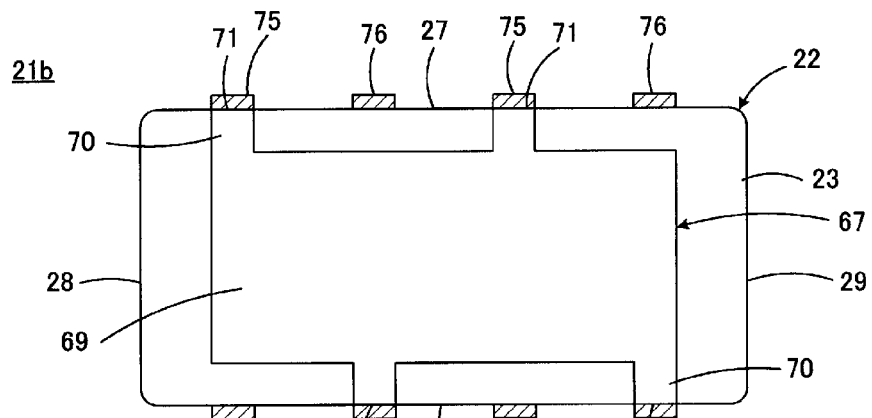
FIGS. 8A to 8B show a third preferred embodiment of the present invention and correspond to FIGS. 3A to 3F.
Figure 8B:
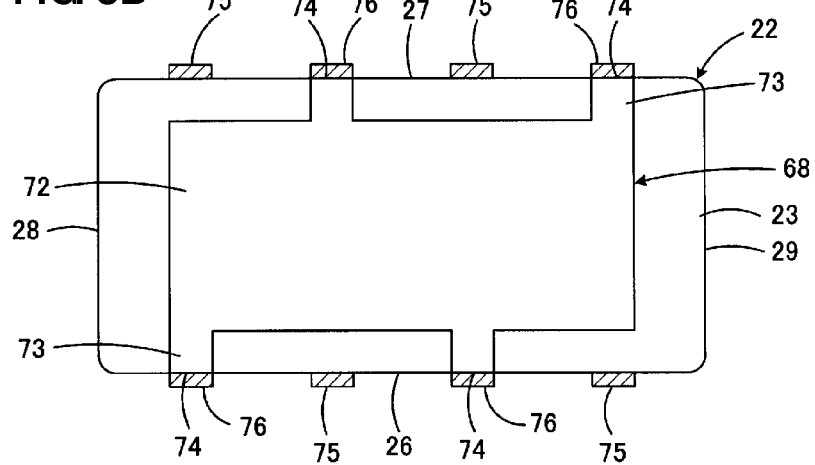

FIGS. 8A and 8B show a configuration of an inner layer of the ceramic element 22. In the inner layer of the ceramic element 22, a plurality of sets of a first internal electrode 67 and a second internal electrode 68 are provided.

As shown in FIG. 8A, each first internal electrode 67 includes a first effective portion 69 and a plurality of first extension portions 70 extending from the first effective portion 69 to the first side surface 26 and second side surface 27. Each first internal electrode 67 includes a first electrode exposed end 71 located at an end of a first extension portion 70 thereof and exposed on the first side surface 26 or second side surface 27.

As shown in FIG. 8B, each second internal electrode 68 includes a second effective portion 72 opposed to the first effective portion 69 and a plurality of second extension portions 73 extending from the second effective portion 72 to the first side surface 26 and second side surface 27. Each second internal electrode 68 includes a second electrode exposed end 74 located at an end of a second extension portion 73 thereof and exposed on the first side surface 26 or second side surface 27.

Although not shown, the first and second dummy conductors and the third and fourth dummy conductors are disposed in the first outer layer and second outer layer, respectively, of the ceramic element 22 in patterns as shown in FIG. 3B and FIG. 3E. In this case, the first and second dummy conductors are alternately arranged along the first side surface 26 and second side surface 27, respectively. In addition, the third and fourth dummy conductors are alternately arranged along the first side surface 26 and second side surface 27, respectively.

As a result, when the ceramic element 22 is viewed along the lamination direction of the ceramic layers 23, the first extension portions 70 and the corresponding first and third dummy conductors are arranged in an overlapped manner and the second extension portions 73 and the corresponding second and fourth dummy conductors are arranged in an overlapped manner.

Therefore, the first electrode exposed ends 71 and the corresponding first and third dummy exposed ends define first exposed end distribution areas extending in a plurality of lines along the lamination direction of the ceramic layers 23 on the first side surface 26 and second side surface 27. In addition, the second electrode exposed ends 74 and the corresponding second and fourth dummy exposed ends define second exposed end distribution areas extending in a plurality of lines along the lamination direction of the ceramic layers 23 on the first side surface 26 and second side surface 27.

The first exposed end distribution areas and the second exposed end distribution areas are alternately arranged on the first side surface 26 and second side surface 27. Each first exposed end distribution area is covered by the first primary plated film of a corresponding first external terminal electrode 75. Thus, first electrode exposed ends 71 and corresponding first and third dummy exposed ends are electrically coupled to a corresponding first external terminal electrode 75. Each second exposed end distribution area is covered by the second primary plated film of a corresponding second external terminal electrode 76. Thus, second electrode exposed ends 74 and corresponding second and fourth dummy exposed ends are electrically coupled to a corresponding second external terminal electrode 76.

As understood from the above-description, in the multilayer ceramic electronic component 21b, the first external terminal electrodes 75 and second external terminal electrodes 76 are alternately arranged on the first side surface 26 and second side surface 27.

Figure 9:
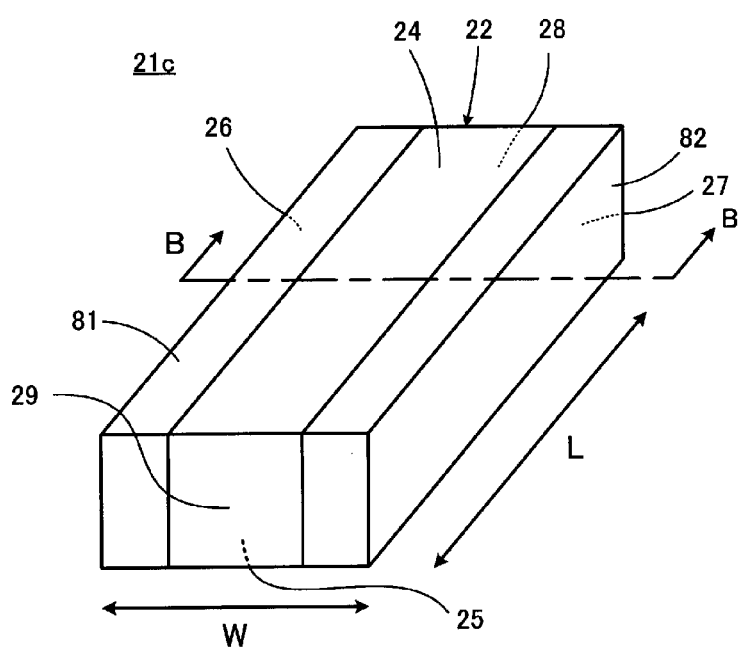
FIG. 9 shows a fourth preferred embodiment of the present invention and corresponds to FIG. 1.
Figure 10:
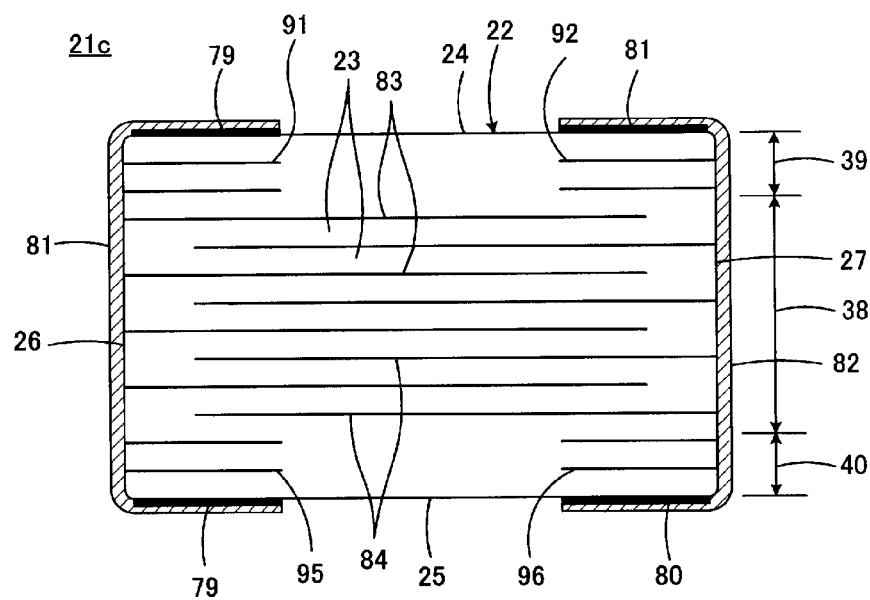
FIG. 10 shows the fourth preferred embodiment of the present invention and corresponds to FIG. 2.

FIG. 9 to FIG. 12B show a multilayer ceramic electronic component 21c according to a fourth preferred embodiment of the present invention. FIG. 9 corresponds to FIG. 1 and is a perspective view showing the multilayer ceramic electronic component 21c. FIG. 10 corresponds to FIG. 2 and is a sectional view taken along line B-B of FIG. 9. FIGS. 11A to 11D correspond to FIGS. 3A to 3F and are plan views showing an internal structure of the ceramic element 22 included in the multilayer ceramic electronic component 21c shown in FIG. 9. In FIG. 9 to FIG. 11D, elements corresponding to the elements shown in FIG. 1 to FIG. 3F are denoted by the same reference numerals and will not be described herein.

The multilayer ceramic electronic component 21c according to the fourth preferred embodiment includes one first external terminal electrode 81 disposed on the first side surface having an increased width-direction size and one second external terminal electrode 82 disposed on the second side surface 27 having an increased width-direction size. More precisely, the first external terminal electrode 81 extends from the first side surface 26 to portions of the adjacent third side surface 28 and fourth side surface 29, and the second external terminal electrode 82 extends from the second side surface 27 to portions of the adjacent third side surface 28 and fourth side surface 29.

As shown in FIG. 10, a first auxiliary conductor 79 and a second auxiliary conductor 80 are provided on each of the first main surface 24 and second main surface 25. This facilitates the plating growth of first primary plated films and second primary plated films of the first external terminal electrodes 81 and second external terminal electrodes 82. The first auxiliary conductors 79 and second auxiliary conductors 80 are also provided on the third side surface 28 and fourth side surface 29.

The multilayer ceramic electronic component 21c is a "LW inverted-type" and is distinguished from typical multilayer ceramic capacitors. The multilayer ceramic electronic component 21c having such a configuration is used as a low-ESL multilayer ceramic capacitor.

As shown in FIG. 10, in the inner layer 38 disposed inside the ceramic element 22, first internal electrodes 83 and second internal electrodes 84 are alternately arranged in the lamination direction with a predetermined ceramic layer 23 therebetween.

Figure 11A:
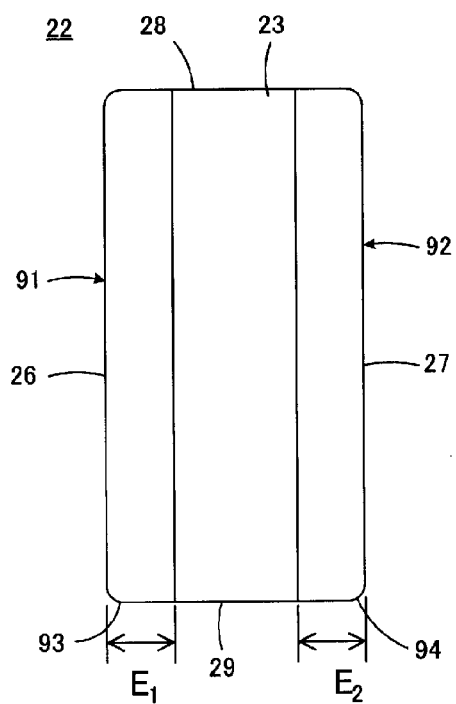
FIGS. 11A to 11D show the fourth preferred embodiment of the present invention and correspond to FIGS. 3A to 3F.
Figure 11C:
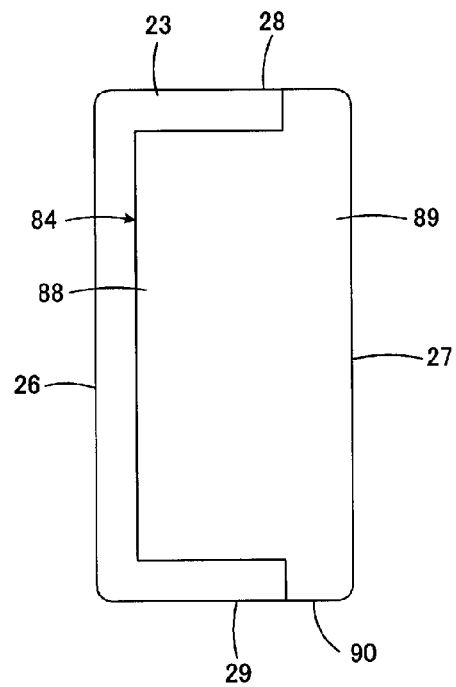
Figure 11B:
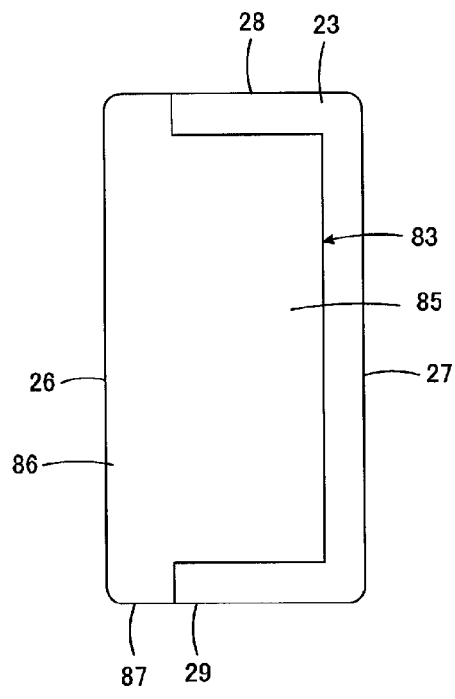

As shown in FIG. 11B, each first internal electrode 83 is substantially T-shaped in a plan view and includes a first effective portion 85 and a first extension portion 86 extending from the first effective portion 85 to the first side surface 26 and portions of the third side surface 28 and fourth side surface 29. Each first internal electrode 83 includes a first electrode exposed end 87 at an end of a first extension portion 86 thereof and exposed on the first side surface 26 and the portions of the third side surface 28 and fourth side surface 29.

As shown in FIG. 11C, each second internal electrode 84 is substantially T-shaped in a plan view and includes a second effective portion 88 opposed to a first effective portion 85 and a second extension portion 89 extending from the second effective portion 88 to the second side surface 27 and portions of the third side surface 28 and fourth side surface 29. Each second internal electrode 84 includes a second electrode exposed end 90 located at an end of a second extension portion 89 thereof and exposed on the second side surface 27 and the portions of the third side surface 28 and fourth side surface 29.

As shown in FIG. 10, in the first outer layer 39 disposed inside the ceramic element 22, a plurality of first dummy conductors 91 and a plurality of second dummy conductors 92 are provided.

As shown in FIG. 11A, each first dummy conductor 91 includes a first dummy exposed end 93 located at an end thereof and exposed on the first side surface 26 and portions of the third side surface 28 and fourth side surface 29. Each second dummy conductors 92 includes a second dummy exposed end 94 located at an end thereof and exposed on the second side surface and portions of the third side surface 28 and fourth side surface 29.

As shown in FIG. 10, a plurality of third dummy conductors 95 and a plurality of fourth dummy conductors 96 are provided in the second outer layer 40 disposed inside the ceramic element 22.

Figure 11D:
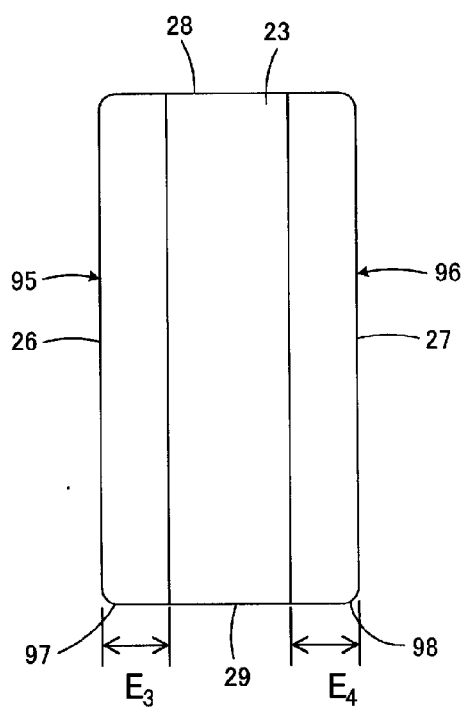

As shown in FIG. 11D, each third dummy conductor 95 includes a third dummy exposed end 97 located at an end thereof and exposed on the first side surface 26 and portions of the third side surface 28 and fourth side surface 29. Each fourth dummy conductor 96 includes a fourth dummy exposed end 98 located at an end thereof and exposed on the second side surface 27 and portions of the third side surface 28 and fourth side surface 29.

When the ceramic element 22 is viewed along the lamination direction of the ceramic layers 23, the first extension portions 86 and the first dummy conductors 91 and third dummy conductors 95 are arranged in an overlapped manner and the second extension portions 89 and the second dummy conductors 92 and fourth dummy conductors 96 are arranged in an overlapped manner.

Therefore, the first electrode exposed ends 87 and the first dummy exposed ends 93 and third dummy exposed ends 97 define a first exposed end distribution area extending in line along the lamination direction of the ceramic layers 23 on the first side surface 26 and the portions of third side surface 28 and fourth side surface 29. In addition, the second electrode exposed ends 90 and the second dummy exposed ends 94 and fourth dummy exposed ends 98 define a second exposed end distribution area extending in line along the lamination direction of the ceramic layers 23 on the second side surface 27 and the portions of third side surface 28 and fourth side surface 29.

The first primary plated film of the first external terminal electrode 81 is arranged such that it covers the first exposed end distribution area. Thus, the first electrode exposed ends 87 and the first dummy exposed ends 93 and third dummy exposed ends 97 are electrically coupled to the first external terminal electrode 81. On the other hand, the second primary plated film of the second external terminal electrode 82 is arranged such that it covers the second exposed end distribution area. Thus, the second electrode exposed ends 90 and the second dummy exposed ends 94 and fourth dummy exposed ends 98 are electrically coupled to the second external terminal electrode 82.

In the fourth preferred embodiment, if the widths of the dummy exposed ends 93, 94, 97, and 98 are examined, it is sufficient to examine the respective widths along the third side surface 28 or fourth side surface 29, since the respective widths along the first side surface 26 or second side surface 27 are the same or substantially the same as one another. A width $E_1$ and a width $E_2$ along the third side surface 28 or fourth side surface 29, of the first dummy exposed ends 93 and second dummy exposed ends 94, respectively, shown in FIG. 11A are substantially the same a width $E_3$ and a width $E_4$ along the third side surface 28 or fourth side surface 29, of the third dummy exposed ends 97 and fourth dummy exposed ends 98, respectively, shown in FIG. 11D.

Figure 12A:
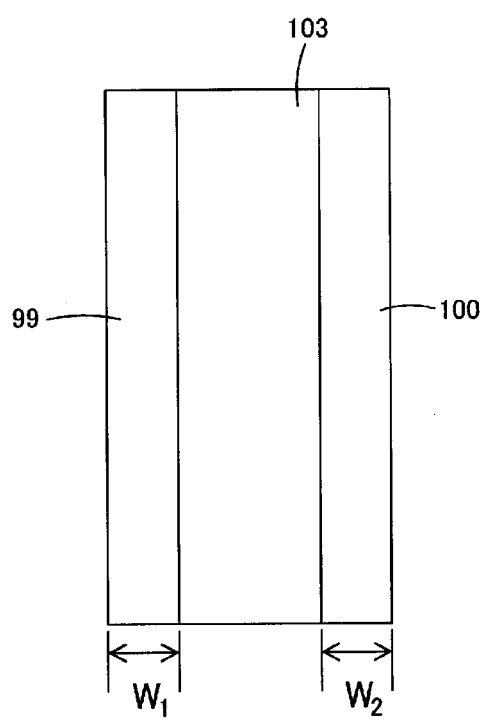
FIG. 12A is a plan view showing a first dummy conductor pattern and a second dummy conductor pattern printed on a ceramic green sheet located in the first outer layer to show a method for manufacturing the multilayer ceramic electronic component shown in FIG. 9.
Figure 12B:
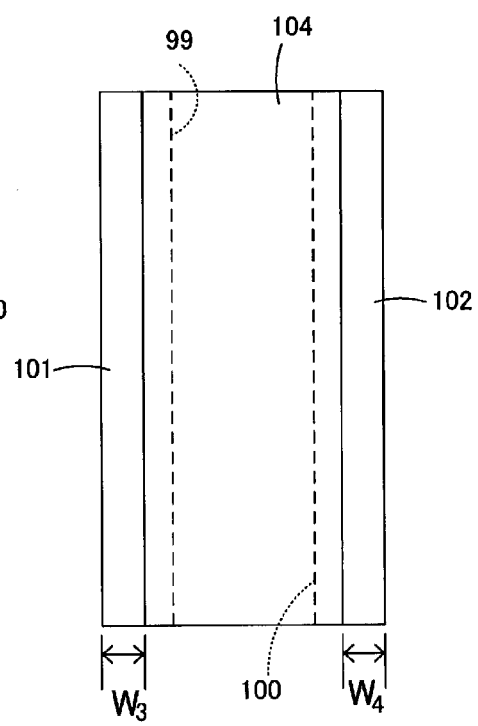
FIG. 12B is a plan view showing a third dummy conductor pattern and a fourth dummy conductor pattern printed on a ceramic green sheet located in the second outer layer to show the method for manufacturing the multilayer ceramic electronic component shown in FIG. 9.
Figure 14:
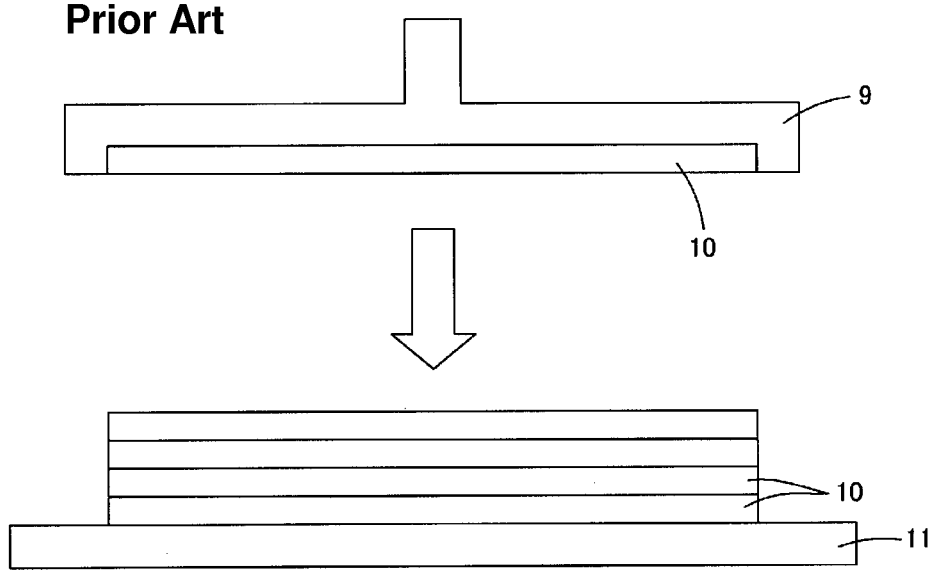
FIG. 14 is a sectional view showing the lamination and sheet-by-sheet crimping process of ceramic green sheets to illustrate problems to be solved by the present invention.
Figure 15:
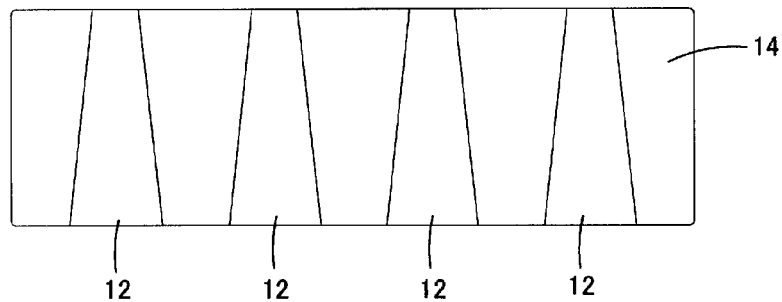
FIG. 15 is a drawing showing a state in which external terminal electrodes to be formed as strips in a plurality of lines on a side surface of a ceramic element undesirably have a trapezoidal shape to show the problems to be solved by various preferred embodiments of the present invention.

FIG. 12A is a plan view showing a ceramic green sheet 103 on which a first dummy conductor pattern 99 and a second dummy conductor pattern 100 defining the first dummy conductor 91 and second dummy conductor 92, respectively, are printed. FIG. 12B is a plan view showing a ceramic green sheet 104 on which a third dummy conductor pattern 101 and a fourth dummy conductor pattern 102 defining the third dummy conductor 95 and fourth dummy conductor 96, respectively, are printed.

The following process is performed such that the width $E_1$ of the first dummy exposed end 93 is substantially the same as the width $E_3$ of the third dummy exposed end 97 and the width $E_2$ of the second dummy exposed end 94 is substantially the same as the width $E_4$ of the fourth dummy exposed end 98 as described with reference to FIG. 11A to 11D.

In the lamination and sheet-by-sheet crimping process, the ceramic green sheet 104 shown in FIG. 12B is laminated in an earlier stage. On the other hand, the ceramic green sheet 103 shown in FIG. 12A is laminated in a later stage. For this reason, the width $W_3$ of the third dummy conductor pattern 101 on the ceramic green sheet 104 is less than the width $W_1$ of the first dummy conductor pattern 99 on the ceramic green sheet 103, and the width $W_4$ of the fourth dummy conductor pattern 102 on the ceramic green sheet 104 is less than the width $W_2$ of the second dummy conductor pattern 100 formed on the ceramic green sheet 103.

FIGS. 13A to 13D are drawings showing a fifth preferred embodiment of the present invention and correspond to FIGS. 3A to 3F. FIGS. 13A to 13D also show external terminal electrodes. In FIGS. 13A to 13D, elements corresponding to the elements shown in FIGS. 3A to 3F are denoted by the same reference numerals and will not be described herein.

In a multilayer ceramic electronic component 21d according to the fifth preferred embodiment, a first external terminal electrode 105 is arranged so as to extend from the third side surface 28 to portions of the first side surface 26 and second side surface 27 in the form of U. On the other hand, a second external terminal electrode 106 is arranged so as to extend from the fourth side surface 29 to portions of the first side surface 26 and second side surface 27 in the form of U.

As shown in FIGS. 13B and 13C, first internal electrodes 107 and second internal electrodes 108 are alternately arranged in the lamination direction with a ceramic layer 23 therebetween in the inner layer disposed inside the ceramic element 22.

As shown in FIG. 13B, each first internal electrode 107 includes a first effective portion 109 and a first extension portion 110 extending from the first effective portion 109 to the third side surface 28 and portions of the first side surface 26 and second side surface 27. Each first internal electrode 107 includes a first electrode exposed end 111 located at an end of a first extension portion 110 thereof and exposed on the third side surface 28 and portions of the first side surface 26 and second side surface 27. Thus, each first internal electrode 107 is substantially T-shaped in a plan view and each of the first extension portion 110 and the first electrode exposed end 111 extend substantially in the form of a U.

As shown in FIG. 13C, each second internal electrode 108 includes a second effective portion 112 and a second extension portion 113 extending from the second effective portion 112 to the fourth side surface 29 and portions of the first side surface 26 and second side surface 27. Each second internal electrode 108 includes a second electrode exposed end 114 located at an end of a second extension portion 113 thereof and exposed on the fourth side surface 29 and portions of the first side surface 26 and second side surface 27. Thus, each second internal electrode 108 is also substantially T-shaped in plan view and each of the second extension portion 113 and the second electrode exposed end 114 extend substantially in the form of a U.

As shown in FIG. 13A, a first dummy conductor 115 and a second dummy conductor 116 are provided in a first outer layer disposed inside the ceramic element 22. Both the first dummy conductor 115 and the second dummy conductor 116 have a shape extending in the form of a substantially U.

The first dummy conductor 115 includes a first dummy exposed end 117 located at an end thereof and exposed on the third side surface 28 and portions of the first side surface 26 and second side surface 27. The second dummy conductor 116 includes a second dummy exposed end 118 located at an end thereof and exposed on the fourth side surface 29 and portions of the first side surface 26 and second side surface 27.

As shown in FIG. 13D, a third dummy conductor 119 and a fourth dummy conductor 120 are provided in a second outer layer disposed inside the ceramic element 22. The fourth dummy conductor 119 and fourth dummy conductor 120 both have a shape substantially in the form of a U.

The third dummy conductor 119 includes a third dummy exposed end 121 located at an end thereof and exposed on the third side surface 28 and portions of the first side surface 26 and second side surface 27. The fourth dummy conductor 120 includes a fourth dummy exposed end 122 located at an end thereof and exposed on the fourth side surface 29 and portions of the first side surface 26 and second side surface 27.

When the ceramic element 22 is viewed along the lamination direction of the ceramic layers 23, the first extension portion 110 and the first dummy conductor 115 and third dummy conductor 119 are arranged in an overlapped manner and the second extension portion 113 and the second dummy conductor 116 and fourth dummy conductor 120 are arranged in an overlapped manner.

Therefore, the first electrode exposed end 111 and the first dummy exposed end 117 and third dummy exposed end 121 define a first exposed end distribution area extending in line along the lamination direction of the ceramic layers 23 on the third side surface 28 and the portions of first side surface 26 and second side surface 27. In addition, the second electrode exposed end 114 and the second dummy exposed end 118 and fourth dummy exposed end 122 define a second exposed end distribution area extending in line along the lamination direction of the ceramic layers 23 on the fourth side surface 29 and the portions of the first side surface 26 and second side surface 27.

The first primary plated film of the first external terminal electrode 105 is arranged such that it covers the first exposed end distribution area. Thus, the first electrode exposed end 111 and the first dummy exposed end 117 and third dummy exposed end 121 are electrically coupled to the first external terminal electrode 105. On the other hand, the second primary plated film of the second external terminal electrode 106 is arranged such that it covers the second exposed end distribution area. Thus, the second electrode exposed end 114 and the second dummy exposed end 118 and fourth dummy exposed end 122 are electrically coupled to the second external terminal electrode 106.

The multilayer ceramic electronic component 21d is mounted on a mount substrate such that the internal electrodes 107 and 108 are perpendicular or substantially perpendicular to the mount substrate, such that the third side surface 28 or fourth side surface 29 is used as the mount surface.

In the fifth preferred embodiment, if the respective widths of the dummy exposed ends 117, 118, 121, and 122 are examined, it is sufficient to examine the respective widths along the first side surface 26 or second side surface 27, since the respective widths along the third side surface 28 or fourth side surface 29 are the same or substantially the same as one another. A width $F_1$ and a width $F_2$ along the first side surface 26 or second side surface 27, of the first dummy exposed end 117 and second dummy exposed end 118 shown in FIG. 13A are substantially the same as a width $F_3$ and a width $F_4$ along the first side surface 26 or second side surface 27, of the third dummy exposed end 121 and fourth dummy exposed end 122 shown in FIG. 13D.

Next, an example experiment performed to confirm the advantages achieved by preferred embodiments of the present invention will be described.

A multilayer ceramic capacitor was manufactured based on a design according to the fourth preferred embodiment. Note that, in this example experiment, what the auxiliary conductors 79 and 80 shown in FIG. 10 were not formed.

First, ceramic green sheets were manufactured by molding and then drying ceramic slurry including $BaTiO_3$ ceramic powder. Then, predetermined internal electrode patterns and predetermined dummy conductor patterns were formed by printing a Ni paste on the ceramic green sheets by screen printing.

Subsequently, a mother block was manufactured by laminating the ceramic green sheets while crimping the ceramic green sheets on a sheet-by-sheet basis using a pressure of about 100 kN, and then by hydrostatically pressing the laminated ceramic green sheets. Then, raw chips were cut off from the mother block and then baked under the conditions of a maximum of about 1200° C. and about 2 hours.

Subsequently, electrolytic barrel plating was performed on the chips under the conditions below so that Cu plated films were formed on the side surfaces of the chips on which electrode exposed ends and dummy exposed ends are to be exposed. In the Cu plating process, a horizontal rotation barrel was used and the barrel rotation speed was set to about 20 rpm. For the Cu plating, strike plating and heavy plating were each performed once. Thus, a Cu plated film having a thickness of about 8 μm obtained by strike plating and heavy plating was obtained.

The conditions for strike Cu plating were as follows.

TABLE 1

| Plating bath | copper pyrophosphate | 14 g/liter |
| --- | --- | --- |
| | pyrophoric acid | 120 g/liter |
| | oxalic acid potassium | 10 g/liter |
| | pH | 8.5 |
| | bath temperature | 25° C. |
| Current density | | 0.1 A/dm² |
| Time | | 60 min. |

The conditions for heavy Cu plating were as shown in Table 2 below.

TABLE 2

| Plating bath | Bath for Pyrobright process manufactured by Uyemura & Co., Ltd. | |
| --- | --- | --- |
| | pH | 8.8 |
| | bath temperature | 55° C. |
| Current density | | 0.3 A/dm² |
| Time | | 60 min. |

With this method, a multilayer ceramic capacitor that includes a ceramic element having a size of about 2.0 mm×about 1.05 mm×about 0.85 mm, a ceramic layer thickness of about 1.6 μm, and an internal electrode thickness of about 1.0 μm and including about 250 ceramic layers laminated in an inner layer was manufactured as a sample.

Note that when the dummy conductor patterns were printed on the ceramic green sheets, two types of green sheets, that is, ceramic green sheets in which the ratio of the total area of the dummy conductor patterns to the area of the ceramic green sheet is about 65% and ceramic green sheets in which the ratio is about 60%, were manufactured to obtain the ceramic green sheets described with reference to FIG. 12. Thus, two types of samples, a sample A and a sample B, were manufactured as shown in Table 3.

Twenty units of each of sample A and sample B were prepared. The length of a fold on the first main surface of an external terminal electrode and the length of a fold on the second main surface thereof were measured using a microscope with respect to each of the samples A and samples B. Then, the difference in length between the upper fold and lower fold was obtained. The results are shown in Table 3.

TABLE 3

| | Ratio of total dummy conductor area to sheet area in first outer layer | Ratio of total dummy conductor area to sheet area in second outer layer | Difference in size between folds of external terminal electrode |
| --- | --- | --- | --- |
| Sample A | 65% | 60% | Ave. 5 μm |
| Sample B | 65% | 65% | Ave. 20 μm |

For the samples A, the difference in size between the upper and lower folds of the external terminal electrode was an average of about 5 μm on average; for the samples B, it was an average of about 20 μm. From the results, it is understood that the difference in size between the upper and lower folds is less in the samples A where the area of the dummy conductors in the second outer layer is less than that of the dummy conductors in the first outer layer, that is, where the widths of the dummy exposed ends in the second outer layer are less than those of the dummy exposed ends in the first outer layer.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A method for manufacturing a multilayer ceramic electronic component comprising steps of:
    (a) preparing a first ceramic green sheet on which at least one of a first internal electrode pattern and a second internal electrode pattern are printed, a second ceramic green sheet on which at least one of a first dummy conductor pattern and a second dummy conductor pattern are printed, and a third ceramic green sheet on which at least one of a third internal electrode pattern and a fourth internal electrode pattern are printed;
    (b) obtaining a non-baked ceramic multilayer body by laminating a predetermined number of the third ceramic green sheets, a predetermined number of the first ceramic green sheets, and a predetermined number of the second ceramic green sheets sequentially from the bottom while applying pressure on a sheet-by-sheet basis;
    (c) baking the non-baked ceramic multilayer body; and (d) forming a first external terminal electrode and a second external terminal electrode by performing direct plating on the baked ceramic multilayer body; wherein in the step (a), a width of the third dummy conductor pattern is made less than a width of the first dummy conductor pattern, and a width of the fourth dummy conductor pattern is made less than a width of the second dummy conductor pattern.

\* \* \* \* \*